3,006,915
PROCESS FOR THE PREPARATION OF 3-KETO-Δ⁴-17,18-STEROIDAL LACTONES AND NOVEL STEROID INTERMEDIATES
James F. Kerwin, Broomall, and Manfred E. Wolff, Elkins Park, Pa., assignors to Smith Kline & French Laboratories, Philadelphia, Pa., a corporation of Pennsylvania
No Drawing. Filed Jan. 11, 1960, Ser. No. 1,450
19 Claims. (Cl. 260—239.5)

This invention relates to a process for the preparation of 3-keto-Δ⁴-17,18-steroidal lactones and to novel steroid intermediates useful therein. The steroidal lactones prepared by the process of this invention are useful as intermediates in the preparation of other steroid derivatives which have valuable therapeutic activity.

More specifically, the 3-keto-Δ⁴-17,18-steroidal lactones prepared by the process of this invention are useful as intermediates in preparing steroids having an 18-oxygenated functional group, such as a hydroxymethylene or formyl group. These latter 18-oxygenated steroids are useful as intermediates for the preparation of the hormone aldosterone and analogues thereof, and are prepared from the steroidal lactone intermediates as described in British Patent No. 805,604. Further, the steroidal lactones are useful as intermediates in the preparation of 11-dehydrocorticosterone derivatives as described in U.S. Patents #2,847,425 and #2,847,412.

The process of this invention for the preparation of 3-keto-Δ⁴-17,18-steroidal lactones is schematically represented as follows:

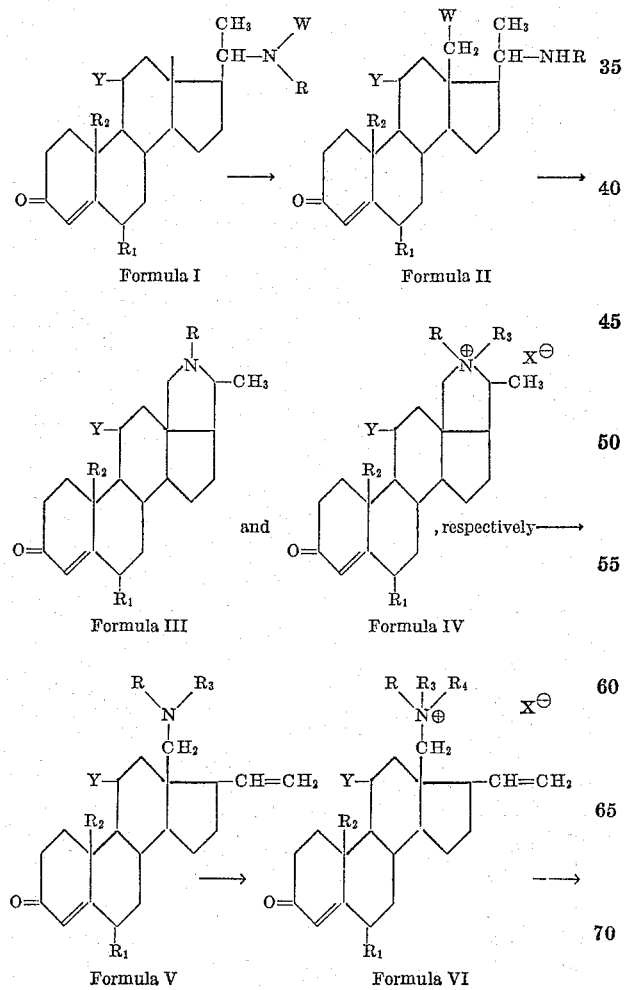

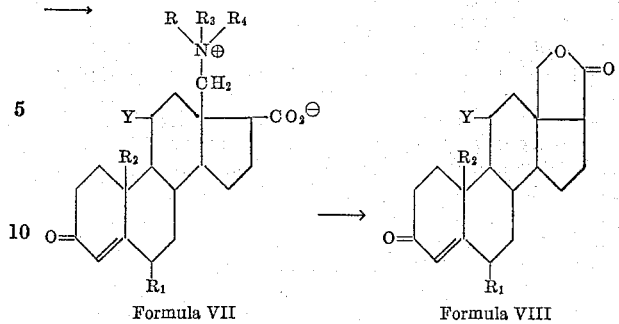

when:

W represents halogen of atomic weight less than 80, such as chlorine or bromine, preferably chlorine;
X represents an anion, preferably an inorganic anion such as hydroxyl, methosulfate, chloride, iodide or bromide, which forms a stable quaternary salt;
Y represents hydrogen or keto;
R, R₃ and R₄ represent lower alkyl of from one to four carbon atoms;
R₁ represents hydrogen, fluoro or methyl; and
R₂ represents hydrogen or methyl.

The preferred compounds of Formulae I–VIII are as follows:

W represents chlorine;
X represents halogen of a minimum atomic weight of 35 or hydroxyl;
Y represents keto;
R, R₃ and R₄ represent methyl;
R₁ represents hydrogen; and
R₂ represents methyl.

The starting materials for the process of this invention, namely the 3-keto-Δ⁴-20-(N-alkyl-N-haloamino) steroids of Formula I, are prepared from the corresponding 20-alkylamino steroid by treatment with a halogenating agent such as for example N-chlorosuccinimide, hypochlorous acid, sodium hypobromite or preferably sodium hypochlorite, advantageously in an unreactive organic solvent for example chloroform at ambient or room temperature, or 25° C., for from 15 minutes to three hours, preferably from 30 minutes to one hour.

The 3-keto-Δ⁴-20-alkylamino steroids used to prepare the N-haloamino derivatives as described above are prepared from the corresponding 3-hydroxy-5,6-unsaturated-20-alkylamino steroids which are obtained in turn from 5,6-unsaturated-20-keto steroids. The 5,6-unsaturated-20-keto steroid is hydrogenated at from 1–5 atmospheres of hydrogen in the presence of a primary lower alkyl amine dissolved in an unreactive organic solvent such as dioxane, and a hydrogenation catalyst such as platinum oxide at from 25–50° C. The resulting 3-hydroxy-5,6-unsaturated-20-alkylamino steroid is oxidized with aluminum isopropoxide by the Oppenauer method in cyclohexanone to give the 3-keto-Δ⁴-20-alkylamino steroid derivative. Alternatively, a 3β,5α-dihydroxy-20-keto steroid is hydrogenated with a primary amine and then oxidized by the Oppenauer method to give the 3-keto-Δ⁴-20-alkylamino steroid.

In accordance with the novel process of this invention as shown above, the 3-keto-Δ⁴-20-(N-alkyl-N-haloamino) steroid of Formula I is dissolved in trifluoroacetic acid and irradiated with ultraviolet light under nitrogen atmosphere at a temperature in the range of from about −20° C. to about 40° C., preferably at room temperature or about 25° C., until titration for residual N-haloamine indicates the reaction is complete. The course of the reaction is followed by periodically removing several drops of reaction solution and adding several ml. of 5% potassium iodide-acetone-water solution. The resulting color change is qualitatively compared with a similar sample removed before irradiation and treated similarly to produce a dark red color standard. The completion of the reaction is indicated when the titration procedure produces an almost colorless solution.

The trifluoroacetic acid is then removed by evaporation in vacuo with provisions made for recovering the acid. The residual 3-keto-$\Delta^4$-18-halo steroid intermediate represented by Formula II above is then reacted with alkali, advantageously without isolation. Thus, the residue consisting essentially of the 18-halo steroid intermediate is treated with an alkali metal hydroxide, such as potassium or sodium hydroxide. Advantageously, the 18-halo steroid is dissolved in an unreactive organic solvent, preferably a lower alkanol such as methanol or ethanol and made basic with a solution of an alkali metal hydroxide, preferably potassium hydroxide, dissolved in a lower alkanol solvent such as methanol or ethanol. In carrying out this step of the process advantageously the alkanolic solution of the 18-halo steroid is treated with sufficient alkanolic alkali metal hydroxide, preferably potassium hydroxide, to raise the pH to in the range of from about 10 to 12. The resulting basic solution is then heated at reflux temperature for from 30 minutes to 24 hours. The product is isolated by concentrating the reaction mixture and pouring the concentrate into water. The solution is extracted with chloroform and the washed, dried chloroform extract is evaporated in vacuo to give a residue which crystallizes upon trituration to the solid 3-keto-$\Delta^4$-conanine derivative of Formula III.

The 3-keto-$\Delta^4$-conanine thus prepared is converted into the quaternary derivatives of Formula IV, usually with a reactive alkyl halide, such as a lower alkyl iodide, preferably the methyl iodide. This quaternary salt is then converted to the quaternary ammonium hydroxide by exchanging the anion or halide portion with the hydroxyl form of an anion exchange resin prepared by passing 10% sodium hydroxide over the quaternary halide until the halide ion is exhausted. More specifically, the quaternary conanine of Formula IV (X$\ominus$ being a halide) dissolved in an organic solvent in which it is soluble and nonreactive, such as the preferred lower alkyl alcohols, for instance methanol or ethanol, is reacted with an excess of the hydroxide form of an anion exchange resin. Exemplary of the resins (halide form) which can be used are the preferred Amberlite IRA-400, as well as Amberlite IRA-401, Amberlite IRA-410, Amberlite IRA-411, Dowex 1, Dowex 2, Imac S-3 and others. Full descriptions of these resins, including what is known of their sources and chemical characteristics are found in "Ion Exchange Resins" by Kunin, 2nd edition, John Wiley, pages 89–96 and "Ion Exchangers in Organic and Biochemistry" by Calmon and Kressman, Interscience, pages 116–129. Exemplary of the preparation of the anion exchange resins used are those disclosed by U.S. Patents No. 2,591,573, No. 2,689,833, No. 2,689,832 and No. 2,725,361, particularly those of the example of No. 2,591,573 and Example 1 of No. 2,689,833.

The chemical structures of the anion exchange resins detailed above can vary widely. The anion exchange resins may be considered as insoluble, high molecular weight electrolytes. The resin must be sufficiently cross linked to have negligible solubility, sufficiently hydrophilic to permit diffusion of ions through the structure at a finite and usable rate and chemically stable. The most useful are the strongly basic exchangers of a type 1 resin containing —NMe$_3\oplus$ groups which have a skeleton derived from a monomer of p-trimethylaminomethylphenyl-ethylene. Otherwise stated, these resins are the hydroxide forms of styrene-type quaternary salts.

The preferred manner of reaction is to pass the quaternary steroid in alcoholic solution over the hydroxide form of the resin in a typical column form, washing the resin with more solvent until the eluate is neutral. The alcohol is then evaporated to leave the steroidal quaternary hydroxide of Formula IV when X$\ominus$ is OH$\ominus$.

The 3-keto-$\Delta^4$-steroidal quaternary hydroxide is then heated, preferably under vacuum, until the effervescence ceases. The heating period is carried out advantageously from about 150–250° C. at low vacuum, such as from about 5–200 mm. pressure. Preferred conditions are at about 180° C. under about 10–50 mm. pressure. The reaction time is usually about two-to-three minutes to four hours, preferably about 10 minutes to about one hour. The residue is then the crude 18-dialkylamino-$\Delta^{4;20}$-steriod of Formula V.

This tertiary amine is quaternized to the compounds of Formula VI by reaction with a reactive lower alkyl halide in an organic, usually highly polar, solvent in which the reactants are substantially soluble and nonreactive, such as acetonitrile, ethanol, methanol, benzene, dimethylformamide or dimethylacetamide, at temperatures of from about 50–150° C. for 1 to 24 hours, preferably in acetonitrile at reflux. The resulting quaternary salt is converted to the hydroxide by passing over the hydroxide form of an anion exchange resin as outlined hereabove for the preparation of the quaternary hydroxides of Formula IV, X$\ominus$ being OH$\ominus$.

The resulting quaternary hydroxide of Formula VI, X$\ominus$ being OH$\ominus$, is then oxidized at about room temperature with permanganate, such as potassium permanganate, either in the preferred water vehicle or in a water-aqueous miscible solvent not subject to oxidation in which the reactants are substantially soluble. Alternatively, the following oxidation conditions can be employed. A solution of the quaternary hydroxide in water is treated with ozone until ozone uptake is ended. The resulting solution is treated with 30% hydrogen peroxide for about 18 hours, the excess hydrogen peroxide is decomposed with palladium catalyst and the filtered solution is evaporated to yield the desired betaine. Alternatively, other oxidizing agents known to oxidize terminal double bonds, such as chromic acid, are used.

The oxidation product is an inner or intramolecular quaternary salt or a betaine of the 18-trialkylamino-17-carboxylates of Formula VIII. This compound is dissolved in an organic solvent in which it is substantially soluble and which is nonreactive with it and with alkali. Particularly valuable as solvents for this step are the formamides and acetamides and their N-lower alkyl derivatives having one or two N-alkyl groups of from 1 to 4 carbons. N,N-dimethylformamide and N,N-dimethylacetamide, or aqueous mixtures thereof, are the preferred and advantageous solvents. The reaction mixture at a basic pH, preferably from about 8 to 14, advantageously about 10 to 13, is heated preferably at from about 50–150° C. but not above the boiling point of the solvent, advantageously from about 75–120° C. until the intramolecular displacement of the quaternary ammonium group is completely, usually from about one to eight hours. The basic conditions can be induced by any suitable base, such as the alkali metal hydroxides or alkoxides particularly sodium or potassium hydroxide or methoxide. Actually the alkali metal salt of the hydroxy carboxylic acid intermediate is transiently formed which is not isolated but transformed directly into the lactone by a neutralization reaction, such as treatment with conventional acid reaction such as with hydrochloric acid, acetic acid, sulfuric acid, etc. The reaction product is the 3-keto-$\Delta^4$-17,18-lactones of Formula VIII which have utility as intermediates as described herein.

It is obvious from the above description that the process of this invention affords an advantageous route for the preparation of the 3-keto-$\Delta^4$-17,18-steroidal lactones of Formula VIII from the 20-(N-alkyl-N-haloamino)-steroids of Formula I. Further, the utility of the novel 3 - keto - $\Delta^4$ - conanine quaternary salts, 18-dialkylamino-$\Delta^{4;20}$-steroids and their 18-quaternary salts, and 3-keto-$\Delta^4$-18-trialkylamino-17-carboxylate betaines of Formulae IV, V, VI and VII as intermediates in the process of this invention is equally apparent.

In the process of this invention, particularly advantageous are the novel steps whereby a 3-keto-Δ⁴-20-(N-alkyl-N-haloamino)-steroid of Formula I is irradiated in the presence of trifluoroacetic acid and the intermediate 18-halo derivative of Formula II is treated with alkali to give the 3-keto-Δ⁴-conanines of Formula III, as described more fully above. Thus, it is now possible to prepare for the first time unsaturated conanine derivatives directly by ring closure at the 18→20 positions of a 20-alkylamino steroid.

It is desired to point out that the term "conanine" where used herein generically is intended to include the 20α or 20β configurations as well as N-lower alkyl derivatives. Further it will be apparent that the reaction sequences of this invention can be applied to compounds analogous to those described above which have other ring substituents stable to potassium permanganate or strong alkali, such as halogen atoms or substituents at positions other than those mentioned herein, and their isomers.

The following examples will serve to illustrate the novel process of this invention and the utility of certain steroidal derivatives as intermediates in the preparation of the 3-keto-Δ⁴-17,18-lactones which are valuable intermediates for the preparation of 18-oxygenated aldosterone and 11-dehydrocorticosterone derivatives. As illustrative examples the following are not intended to limit the scope of this invention since obvious alternatives to the methods disclosed herein are likewise within the purview of this invention.

Example 1

To a solution of 16–18 g. of methylamine in 200 ml. of ethanol is added 15.8 g. of 3β-hydroxy-5-pregnen-20-one and 0.5 g. of platinum oxide. The mixture is hydrogenated on the Parr apparatus for seven hours, at which time one mole of hydrogen is absorbed. Methylene chloride is added to the mixture to dissolve the product, the catalyst is removed by filtration and filtrate evaporated to dryness. The residue is taken up in chloroform and extracted with 5% acetic acid. The acid extract is made basic with sodium hydroxide and the free amine isolated. Recrystallization from aqueous methanol yields 3β-hydroxy-20α-methylamino-5-pregnene, M.P. 221–223° C.

A solution of 7.8 g. of the amine in 600 ml. of anhydrous toluene and 114 ml. of cyclohexanone is heated to reflux. A solution of 25.0 g. of aluminum isopropoxide in 100 ml. of toluene is added dropwise and then refluxing with stirring is continued for two hours. Glacial acetic acid (10 ml. in 25 ml. of toluene) is added, the mixture steam distilled for one hour then cooled. The mixture is made basic with 40% sodium hydroxide solution, cooled and extracted with chloroform. The chloroform extract is washed with water and then extracted with 5% acetic acid and water. The aqueous extracts are made basic, the solid filtered off and recrystallized from acetonitrile to give 3-keto-20-methylamino-4-pregnene, M.P. 159–166° C.

A solution of 0.5 g. of 3-keto-20-methylamino-4-pregnene in 10 ml. of methylene chloride is treated twice with 25 ml. of 5% sodium hypochlorite solution for 15 minute periods, with stirring. The organic layer is washed with water, dried and evaporated to give 3-keto-20-(N-methyl-N-chloroamino)-4-pregnene, M.P. above 133° C.

This chloroamine (3.5 g.) is dissolved in 35 ml. of cold trifluoroacetic acid and subjected to ultraviolet irradiation under nitrogen atmosphere for 35 minutes. The trifluoroacetic acid is evaporated under reduced pressure and the residual 18-chloro-3-keto-20-methylamino-4-pregnene is dissolved in 25 ml. of methanol. The solution is treated with 25% methanolic potassium hydroxide solution to raise the pH to 10–11.5. The basic solution is then refluxed for one hour, concentrated and poured into 100 ml. of water. The aqueous solution is extracted with methylene chloride and the extract water washed and dried. The extract is evaporated and heated on the steam bath for two hours with 7.0 ml. of acetic anhydride to convert any secondary amine to the amide. The mixture is poured into about 200 ml. of water, filtered and the filtrate made basic with 40% sodium hydroxide solution. The oil is extracted into methylene chloride, water washed, dried and evaporated to give 3-keto-Δ⁴-conanine.

A solution of 6.0 g. of 3-keto-Δ⁴-conanine and 9.6 ml. of methyl iodide in 50 ml. of benzene is heated at reflux for two hours. The mixture is cooled, diluted with ether and filtered to give 3-keto-Δ⁴-conanine methiodide, M.P. 275–276° C. (dec.).

A solution of 1.0 g. of the methiodide dissolved in methanol is passed through 20.0 g. of Amberlite IRA–400 resin (hydroxide form). The resin column is washed with methanol until the eluate is neutral. The combined methanol solutions are evaporated to leave the quaternary hydroxide. This residue is heated at 180° C. under 15 mm. pressure until the bubbles cease to give 3-keto-18-dimethylamino-4,20-pregnadiene.

A solution of 1.0 g. of the pregnadiene in 100 ml. of acetonitrile and 5 ml. of methyliodide is refluxed for 20 hours, then evaporated to give 3-keto-18-dimethylamino-4,20-pregnadiene methiodide, M.P. 236–237° C. (dec.). The salt is dissolved in methanol and passed over an Amberlite IRA–400 resin (hydroxide) column. The methanol eluate is evaporated to give the 3-keto-18-trimethylammonium-4,20-pregnadiene hydroxide.

A solution of 3.7 g. of the quaternary hydroxide in 75 ml. of water is treated dropwise with a solution of 3.9 g. of potassium permanganate in 100 ml. of water at ambient temperature. The precipitated manganese dioxide is separated and the aqueous filtrate is evaporated to give the methyl 3-keto-18-dimethylamino-4-etiocholenate, betaine. This compound is suspended in 100 ml. of dimethylformamide and adjusted to a pH of 12 with 10% sodium hydroxide solution. The mixture is heated under nitrogen on the steam bath for five hours, then evaporated to dryness in vacuo. An aqueous solution of the residue is treated with charcoal, filtered and made acid with concentrated hydrochloric acid. The resulting precipitate is extracted with ether and the ethereal solution evaporated to give 3-keto-18-hydroxy-4-etiocholenic acid, γ-lactone.

Example 2

To 7.2 g. of 5α-hydroxy-6β-methyl-3,11,20-allopregnantrione in 100 ml. of methanol is added 0.4 g. of sodium borohydride dissolved in pyridine. After 10 minutes an excess of dilute hydrochloric acid is added and the mixture extracted with methylene chloride. Evaporation of the solvent and chromatography of the residue over alumina yields 3β,5α-dihydroxy-6β-methyl-11,20-allopregnandione.

The dione prepared as above (18.0 g.) and 0.5 g. of platinum oxide are added to 200 ml. of ethanol containing 10% w./w. of methylamine and the mixture hydrogenated until one mole of hydrogen is absorbed. The catalyst is removed by filtration and the filtrate evaporated to dryness. Treatment of the residue as described in Example 1 yields 3β,5α-dihydroxy-6β-methyl-20α-methylaminoallopregnan-11-one.

A solution of 7.6 g. of the amine in 500 ml. of anhydrous toluene and 100 ml. of cyclohexanone is heated at reflux and a solution of 25.0 g. of aluminum isopropoxide in 100 ml. of toluene is added dropwise with stirring. Refluxing is continued for two hours, 10 ml. of glacial acetic acid is added and the mixture steam distilled. Working up as in Example 1 yields 3,11-diketo-6β-methyl-20-methylamino-4-pregnene.

A solution of 6.0 g. of 3,11-diketo-6β-methyl-20-methylamino-4-pregnene in 300 ml. of chloroform is stirred with 300 ml. of 5% sodium hypochlorite solution for one hour. The hypochlorite is removed and the treatment repeated. The chloroform layer is separated, washed with water, dried and evaporated to give 3,11-diketo - 6β - methyl - 20 - (N-methyl-N-chloroamino)-4-pregnene.

The above N-chloroamine (6.6 g.) is dissolved in 65 ml. of redistilled trifluoroacetic acid and irradiated with ultraviolet light under nitrogen for 40 minutes. The trifluoroacetic acid is evaporated in vacuo and the residual 18 - chloro-3,11-diketo-6β-methyl - 20 - methylamino-4-pregnene is dissolved in 75 ml. of methanol, made strongly basic with 25% methanolic potassium hydroxide. The solution is refluxed for one hour, concentrated in vacuo, poured into 500 ml. of water and extracted with chloroform. The chloroform extract is washed, dried and evaporated. The residue is boiled for two hours with 12.5 ml. of acetic anhydride, poured into 250 ml. of water and filtered. The filtrate is adjusted to pH 11 and extracted with chloroform. The extract is washed, dried and evaporated to give 3,11-diketo-6β-methyl-Δ⁴-conanine.

A mixture of 1 g. of the conanine and 1.8 ml. of methyl iodide in 10 ml. of benzene is heated at reflux for five hours. The mixture is worked up as in Example 1 to give the methiodide. This compound (1 g.) in methanol is passed over an anion exchange resin (Amberlite IRA–401, hydroxide form) to give a methanolic solution of the quaternary hydroxide. The crude residual product is then heated at 190° C. under 25 mm. pressure until effervescence stops to give 3,11-diketo-18-dimethylamino-6β-methyl-4,20-pregnadiene. This diene (0.5 g.) and 4 ml. of methyl iodide is heated in acetonitrile for 24 hours to give a residue of the quaternary iodide which is dissolved in methanol and exchanged with hydroxide over an anion exchange resin as in Example 1. The quaternary hydroxide (1.5 g.) in 75 ml. of water is oxidized at ambient temperature with 2.5 g. of potassium permanganate. After filtration, evaporation of the aqueous solvent gives methyl 3,11-diketo-18-dimethylamino-6β-methyl-4-etiocholenate, betaine. The betaine (1.5 g.) in 250 ml. of dimethylformamide taken to pH 12 with 10% potassium hydroxide is heated at 100° C. under nitrogen for four hours. The solution is charcoaled and made acid to separate 3,11-diketo-6β-methyl-18-hydroxy-4-etiocholenic acid, γ-lactone.

*Example 3*

To a solution of 5–6 g. of methylamine in 100 ml. of ethanol is added 6.0 g. of 3β-hydroxy-19-nor-5-pregnen-20-one and 0.2 g. of platinum oxide and the mixture is hydrogenated until one mole of hydrogen is absorbed. The catalyst is filtered off and the filtrate evaporated to dryness. The residue is taken up in chloroform and extracted with dilute acetic acid. The acid extract is made basic with dilute sodium hydroxide and the free amine isolated. Recrystallization gives 3β-hydroxy-20α-methylamino-19-nor-5-pregnene.

Following the general reaction procedures of Example 1, the amine (7.5 g.) is oxidized with aluminum isopropoxide in toluene and cyclohexanone to give the 3-keto-20-methylamino-19-nor-4-pregnene. A solution of 5.0 g. of the amine in methylene chloride is treated with 5% sodium hypochlorite solution to give the N-chloroamine which is dissolved in 70 ml. of trifluoroacetic acid and irradiated with ultraviolet light to yield after alkali treatment the ring closed 3-keto-19-nor-Δ⁴-conanine. The conanine is converted to the quaternary hydroxide and this compound is heated at 180° C. at 15 mm. to yield 3-keto-18-dimethylamino-19-nor-4,20-pregnadiene. The diene (1.0 g.) is quaternized and oxidized as in Example 1 and the resulting methyl 3-keto-18-dimethylamino-19-nor-4-etiocholenate, betaine is dissolved in dimethylformamide and heated on the steam bath under nitrogen at pH 12 to yield the 3-keto-18-hydroxy-19-nor-4-etiocholenic acid, γ-lactone.

*Example 4*

An anhydrous solution of 12.0 g. of 3β-hydroxy-19-nor-5-pregnen-20-one in 250 ml. of benzene and 20 ml. of ethylene glycol is treated with 0.3 g. of p-toluenesulfonic acid monohydrate and then refluxed for four hours with continuous removal of water formed in the reaction. The reaction mixture is washed with sodium bicarbonate solution and water, dried and the solvent removed to give 20,20-ethylenedioxy-3β-hydroxy-19-nor-5-pregnene.

A solution of the above ethylenedioxy derivative (8.7 g.) in 100 ml. of chloroform is treated with 6.8 g. of monoperphthalic acid in 170 ml. of ether. After standing 12 hours at 0° C. the reaction mixture is diluted with an equal volume of ether and washed with aqueous potassium carbonate and water until neutral. The dried solution is evaporated to give 20,20-ethylenedioxy-5α,6α-epoxy-3β-hydroxy-19-norallopregnane.

The epoxide prepared as above (5.1 g.) in a mixture of 125 ml. of dry benzene and 200 ml. of ether is added to a solution of methyl magnesium iodide prepared from 3.0 g. of magnesium and 8.0 ml. of methyl iodide in 50 ml. of ether. The mixture is stirred at room temperature for six hours, allowed to stand for 12 hours and then poured into an excess of aqueous ammonium chloride. The organic layer is washed, dried and evaporated. The residue is dissolved in 125 ml. of 90% methanol and 2 g. of oxalic acid is added. The mixture is refluxed for 30 minutes and then concentrated to give 3β,5α-dihydroxy-6β-methyl-19-norallopregnan-20-one.

A mixture of 16.7 g. of the norpregnanone prepared as above and 0.5 g. of platinum oxide in 200 ml. of ethanol containing 22–24 g. of methylamine is shaken under hydrogen until one mole of hydrogen is absorbed. The catalyst is removed and the ethanol evaporated. The residual amines are purified via the hydrochlorides and fractionally recrystallized to give 3β,5α-dihydroxy-6β-methyl-20α-methylamino-19-norallopregnane.

A solution of 5.0 g. of the amine is oxidized with 15.0 g. of aluminum isopropoxide in 100 ml. of toluene and 100 ml. of cyclohexanone at reflux temperature for two hours. Glacial acetic acid (10 ml.) is added and the mixture steam distilled. Following the procedure of Example 1, 3-keto-6β-methyl-20-methylamino-19-nor-4-pregnene is obtained.

A solution of 6.0 g. of 3-keto-6β-methyl-20-methylamino-19-nor-4-pregnene in 600 ml. of methylene chloride is stirred with 600 ml. of 5% sodium hypochlorite solution for one hour, when the hypochlorite is removed and the treatment is repeated. The chloroform layer is separated, washed with water, dried and evaporated to yield 3-keto-6β-methyl-20-(n-methyl-N-chloroamino)-19-nor-4-pregnene.

The N-chloroamine (10.0 g.) is dissolved in 130 ml. of redistilled trifluoroacetic acid and subjected to ultraviolet irradiation under nitrogen atmosphere for 40 minutes. The trifluoroacetic acid is evaporated in vacuo and the residual 18-chloro-3-keto-6β-methyl-20-methylamino-19-nor-4-pregnene is dissolved in 150 ml. of methanol, made strongly basic with 25% methanolic potassium hydroxide solution and refluxed for one hour. The solution is concentrated in vacuo, poured into 1000 ml. of water and extracted with chloroform. The residue obtained from evaporation of the washed, dried chloroform solution is boiled for two hours with 25 ml. of acetic anhydride, poured into 500 ml. of water and filtered. The clear filtrate is made alkaline in the cold to pH 11 and extracted with chloroform. The chloroform layer is washed with water, dried and evaporated to give 3-keto-6β-methyl-19-nor-Δ⁴-conanine.

A solution of 1.6 g. of 3-keto-6β-methyl-19-nor-Δ⁴-conanine and 2.5 ml. of ethyl bromide in 25 ml. of benzene is heated at reflux for six hours. The mixture is cooled and diluted with ether to give the ethobromide.

Alternatively, a solution of 5 g. of the Δ⁴-conanine and 7 ml. of methyl iodide in 30 ml. of benzene is heated at reflux for two hours. The mixture is cooled and treated with ether to give the methiodide.

A solution of 2 g. of either quaternary in methanol is passed over a column of Amberlite IRA–400 resin (hydroxide). The methanol eluate is evaporated to give the hydroxide which is heated to 200° C. under 50 mm. pressure until the effervescence stops. After recrystallization, 3-keto-18-dimethylamino-6$\beta$-methyl-19-nor-4,20-pregnadiene is obtained. The diene (500 mg.) is reacted with ethyl bromide in acetonitrile at reflux for 12 hours. The solution is evaporated to leave the ethobromide. This crude compound in ethanol is passed over a hydroxide resin column to exchange the bromide with hydroxide. A solution of 3.0 g. of the resulting quaternary hydroxide and 3.50 g. of potassium permanganate in water is reacted at room temperature. After filtration the filtrate is evaporated to leave ethyl 18-dimethylamino-3-keto-6$\beta$-methyl-19-nor-4-etiocholenate, betaine which is suspended in 150 ml. of dimethylacetamide, adjusted to pH 10 with potassium hydroxide and heated at 210° C. under an atmosphere of nitrogen. The residue is recrystallized to give 3-keto-18-hydroxy-6$\beta$-methyl-19-nor-4-etiocholenic acid, $\gamma$-lactone.

Example 5

To a solution of methylamine in 100 ml. of ethanol (10% w./w.) is added 9.3 g. of 3$\beta$-acetoxy-5-pregnen-11,20-dione and 0.25 g. of platinum oxide. The mixture is then hydrogenated until one mole of hydrogen is absorbed. The catalyst is filtered off and the solvent evaporated. The residue is taken up in dilute hydrochloric acid, the acid solution made basic and then extracted with chloroform. By removing the chloroform in vacuo and recrystallization of the residue, 3$\beta$-acetoxy-20$\alpha$-methylamino-5-pregnen-11-one is obtained which is hydrolyzed by refluxing in methanolic potassium hydroxide to the 3-hydroxy derivative.

A solution of 5.0 g. of 3$\beta$-hydroxy-20$\alpha$-methylamino-5-pregnen-11-one in 250 ml. of toluene and 100 ml. of cyclohexanone is oxidized with 15.0 g. of aluminum isopropoxide by heating at reflux for two hours. Treating the reaction mixture and working up as in Example 1 yields 3,11-diketo-20-methylamino-4-pregnene. The amine (6.0 g.) is treated with 5% sodium hypochlorite solution as in Example 1 to give 3,11-diketo-20-(N-methyl-N-chloroamino)-4-pregnene which is dissolved in 75 ml. of trifluoroacetic acid and irradiated with ultraviolet light for 40 minutes. Alkali treatment of the resulting 3,11-diketo-18-chloro-20-methylamino-4-pregnene as described in Example 1 yields 3,11-diketo-$\Delta^4$-conanine.

The $\Delta^4$-conanine (1.5 g.) is converted to the quaternary hydroxide as in Example 1. This compound is heated at 180° C. at 20 mm. to give 3,11-diketo-18-dimethylamino-4,20-pregnadiene. After quaternization and oxidation as in Example 1, methyl 3,11-diketo-18-dimethylamino-4-etiocholenate, betaine is obtained. The betaine (750 mg.) in 100 ml. of dimethylacetamide at pH 13 is heated at 120° C. under nitrogen to give the desired 3,11-diketo-18-hydroxy-4-etiocholenic acid, $\gamma$-lactone.

Example 6

To a solution of methylamine in 200 ml. of ethanol (11–12.0 g. per 100 ml.) is added 0.5 g. of platinum oxide catalyst and 15.0 g. of 6$\beta$-fluoro-3$\beta$,5$\alpha$-dihydroxy-20-allopregnanone (U.S. Patent No. 2,838,528). The mixture is hydrogenated until one mole of hydrogen is absorbed. The catalyst is removed and the solvent evaporated to give 6$\beta$-fluoro-3$\beta$,5$\alpha$-dihydroxy-20-methylamino-allopregnane.

The amine (5.0 g.) is oxidized with 20.0 g. of aluminum isopropoxide in toluene and cyclohexanone solution by heating at reflux for two hours. Glacial acetic acid is added and the reaction mixture steam distilled and similarly worked up as described in Example 1 to give 3-keto-6$\beta$-fluoro-20-methylamino-4-pregnene. This compound (7.0 g.) is reacted with hypochlorite as in Example 1 to give 3-keto-6$\beta$-fluoro-20-(N-methyl-N-chloroamino)-4-pregnene which is dissolved in 75 ml. of trifluoroacetic acid and irradiated with ultraviolet light for 40 minutes. The solvent is evaporated to give the 18-chloro compound. After treatment with alcoholic potassium hydroxide and working up as in Example 1, 3-keto-6$\beta$-fluoro-$\Delta^4$-conanine is obtained.

Following the general reaction procedures of Example 1, the conanine (2 g.) is converted into the quaternary hydroxide. This is heated at 175° C. at 15 mm. until the evolution of bubbles ceases. The resulting 3-keto-6$\beta$-fluoro-18-dimethylamino-4,20-pregnadiene is quaternized to the hydroxide and oxidized to give methyl 3-keto-6$\beta$-fluoro-18-dimethylamino-4-etiocholenate, betaine which (500 mg.) is dissolved in 50 ml. of dimethylacetamide at pH 12 and heated for several hours at 100° C. under nitrogen to give 3-keto-6$\beta$-fluoro-18-hydroxy-4-etiocholenic acid, $\gamma$-lactone.

Example 7

To a stirred mixture of 25 g. of potassium bifluoride, 7.5 ml. of acetic anhydride and 100 ml. of acetic acid is added 13.0 g. of 20,20-ethylenedioxy-5$\alpha$,6$\alpha$-epoxy-3$\beta$-hydroxy-19-norallopregnane (prepared as in Example 4). The reaction mixture is stirred for two days at room temperature, methylene chloride is added and the solution washed with water. The methylene chloride solution is evaporated and the residue purified by chromatography to yield 3$\beta$,5$\alpha$-dihydroxy-6$\beta$-fluoro-20,20-ethylenedioxy-19-norallopregnane. Hydrolysis of this compound (10.0 g.) in methanol and one normal aqueous sulfuric acid gives 3$\beta$,5$\alpha$-dihydroxy-6$\beta$-fluoro-19-nor-20-allopregnanone.

Following the procedure outlined in Example 1, the dihydroxy compound (10.0 g.) is hydrogenated with an excess of ethylamine in ethanol solution and platinum oxide catalyst until one mole of hydrogen is absorbed to give 3$\beta$,5$\alpha$-dihydroxy-6$\beta$-fluoro-20-ethylamino-19-norallopregnane.

The amine (8.0 g.) is oxidized with 25.0 g. of aluminum isopropoxide in 300 ml. of anhydrous toluene and 110 ml. of cyclohexanone at reflux temperature for two hours. Glacial acetic acid (10 ml.) is added and the mixture steam distilled. Working up as described in Example 1 yields 3-keto-6$\beta$-fluoro-20-ethylamino-19-nor-4-pregnene. The 20-ethylamino compound (7 g.) is reacted with hypochlorite solution, irradiated in trifluoroacetic acid and reacted with alkali in succession as in Example 1 to give 3-keto-6$\beta$-fluoro-19-nor-N-ethyl-$\Delta^4$-conanine.

This compound (1.5 g.) is reacted with ethyl iodide and then passed over an anion exchange resin to form the quaternary hydroxide as in Example 1. Heating the salt at 200° C. at 100 mm. gives 3-keto-6$\beta$-fluoro-18-diethylamino-19-nor-4,20-pregnadiene, which is quaternized with ethyl iodide, exchanged over Amberlite IRA–400 to the hydroxide and oxidized with potassium permanganate as in Example 1 to give ethyl 3-keto-6$\beta$-fluoro-18-diethylamino-19-nor-4-etiocholenate, betaine. The betaine (750 mg.) is dissolved in dimethylformaide at 110° C. under nitrogen to give 3-keto-6$\beta$-fluoro-18-hydroxy-19-nor-4-etiocholenic acid, $\gamma$-lacetone.

Example 8

To a solution of 6.9 g. of 5$\alpha$-hydroxy-6$\beta$-methyl-3,20-allopregnandione in 200 ml. of methanol is added 0.4 g. of sodium borohydride dissolved in pyridine. After 10 minutes an excess of dilute hydrochloric acid is added and the mixture extracted with methylene chloride. Removal of the solvent and chromatography of the residue over alumina gives 3$\beta$,5$\alpha$-dihydroxy-6$\beta$-methyl-20-allopregnanone.

A mixture of 7.0 g. of 3$\beta$,5$\alpha$-dihydroxy-6$\beta$-methyl-20-allopregnanone and 0.2 g. of platinum oxide in 100 ml. of ethanol containing 11–12 g. of methylamine is shaken under hydrogen until one mole is absorbed. The catalyst is removed and the reaction mixture worked up as in Example 1 to yield 3β,5α-dihydroxy-6β-methyl-20α-methylaminoallopregnane.

Following the general reaction procedures of Example 1, the above dihydroxy amine (5.0 g.) is oxidized with 15.0 g. of aluminum isopropoxide in toluene and cyclohexanone solution to give 3-keto-6β-methyl-20-methylamino-4-pregnene. This compound is similarly converted to 3-keto-6β-methyl-Δ⁴-conanine via the N-chloroamine by irradiation in trifluoroacetic acid and alkali treatment. The Δ⁴-conanine (8 g.) is reacted with 10 ml. of methyl iodide in benzene solution at reflux and exchanged over Amberlite IRA–400 to the hydroxide form. The quaternary hydroxide residue (7 g.) is heated at 185–195° C. at 22 mm. pressure to give the 3-keto-6β-methyl-18-dimethylamino-4,20-pregnadiene. The diene is purified by recrystallization and then requaternized with methyl bromide and converted to the hydroxide by ion exchange. Oxidation of the quaternary (2 g.) in 100 ml. of water with an excess of potassium permanganate gives methyl 3 - keto-6β-methyl-18-dimethylamino-4-etiocholenate, betaine which (1.1 g.) is dissolved in 150 ml. of dimethylformamide at pH 12 and heated on the steam bath under nitrogen atmosphere. Evaporation gives 3-keto-6β-methyl-18-hydroxy-4-etiocholenic acid, γ-lactone.

*Example 9*

Following the procedure outlined in U.S. Patents 2,847,425 and 2,847,412, 3,11-diketo-18-hydroxy-4-etiocholenic acid, γ-lactone (prepared as in Example 5 of this application) is reacted with hydrazine to open the lactone ring thereby forming the corresponding hydrazide which on treatment with an excess of methane sulfonyl chloride and then desulfurization with deactivated Raney nickel is converted to 3,11-diketo-4-etiocholenic acid. This latter compound is converted to Kendall's compound A acetate by the classical diazoketone synthesis involving treatment of the diketo acid with oxalyl chloride followed by reaction of the acid chloride with diazomethane and acetic acid. Hydrolysis of the acetate gives Kendall's compound A, 11-dehydrocorticosterone, an adrenocortical hormone of use in the clinical treatment of disorders resulting from loss of adrenal function.

*Example 10*

Amberlite IRA–400 in the chloride form (100 g.) is packed into a glass chromatography column and 10% sodium hydroxide solution is passed through until the resin is free of chloride ion which is determined by assaying the eluate for chloride ion by acidification with nitric acid and addition of silver nitrate solution. When no silver chloride precipitates, the resin is free of chloride ion. The resin is then washed with distilled water until the washings are neutral. Further washing with methanol and air drying gives the Amberlite IRA–400 in the hydroxide form.

What is claimed is:

1. The method of forming 3-keto-Δ⁴-17,18-steroidal lactones having the following formula:

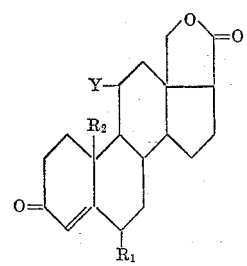

in which Y is a member selected from the group consisting of hydrogen and keto; $R_1$ is a member selected from the group consisting of hydrogen, fluoro and methyl; and $R_2$ is a member selected from the group consisting of hydrogen and methyl, which comprises irradiating with ultraviolet light in the presence of trifluoroacetic acid a 3-keto-Δ⁴-20-(N-alkyl-N-haloamino)-steroid having the following formula:

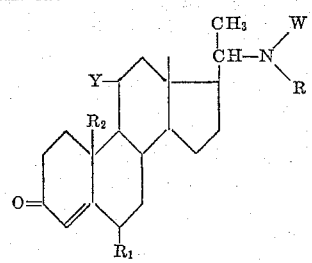

in which W is a halo member selected from the group consisting of chloro and bromo; R is lower alkyl of from one to four carbon atoms; and Y, $R_1$ and $R_2$ are as defined above, to form a 3-keto-Δ⁴-18-halo steroid having the following formula:

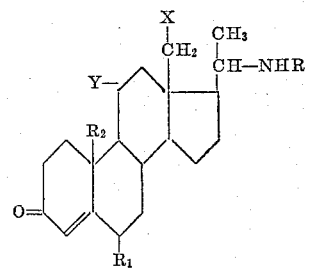

in which Y, W, R, $R_1$ and $R_2$ are as defined above; treating said 18-halo steroid with alkali to form a 3-keto-Δ⁴-conanine having the following formula:

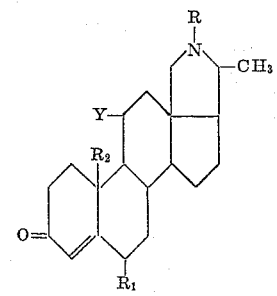

in which Y, R, $R_1$ and $R_2$ are as defined above; treating said conanine with a reactive lower alkyl halide having from one to four carbon atoms to form a 3-keto-Δ⁴-quaternary ammonium steroid having the following formula:

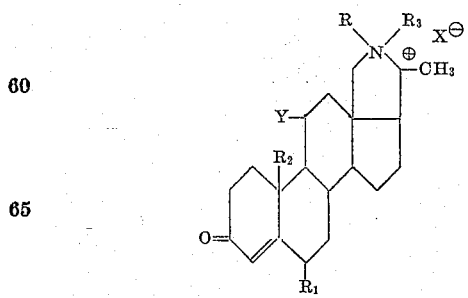

in which $R_3$ is lower alkyl of from one to four carbon atoms; X⊖ is a reactive halogen atom having a minimum atomic weight of 35; and Y, R, $R_1$ and $R_2$ are as defined above; treating said quaternary ammonium halide with the hydroxide form of an anion exchange resin to form the quaternary ammonium hydroxide; heating said quaternary hydroxide to form a 18-dialkylamino-$\Delta^{4;20}$-steroid having the following formula:

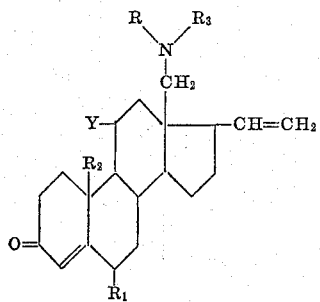

in which Y, R–R$_3$ are as defined above; treating said 18-dialkylamino steroid with a reactive lower alkyl halide having from one to four carbon atoms to form a 3-keto-$\Delta^{4;20}$-quaternary ammonium steroid having the following formula:

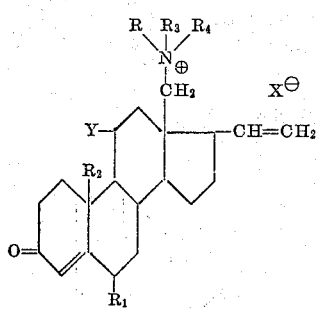

in which R$_4$ is lower alkyl of from one to four carbon atoms; X$^\ominus$ is a reactive halogen atom having a minimum atomic weight of 35; and Y, R–R$_3$ are as defined above; treating said 3-keto-$\Delta^{4;20}$-quaternary ammonium halide with the hydroxide form of an anion exchange resin to form the 3-keto-$\Delta^{4;20}$-quaternary ammonium hydroxide; oxidizing said 3-keto-$\Delta^{4;20}$-quaternary hydroxide to form a betaine of the following formula:

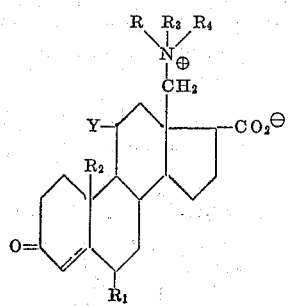

in which Y, R–R$_4$ are as defined above; and heating said betaine.

2. A chemical compound of the class consisting of a free base and its quaternary salts, the free base having the following structural formula:

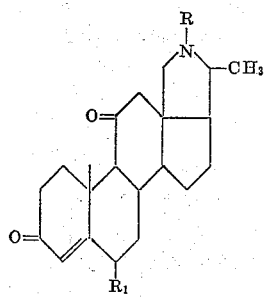

in which R is lower alkyl of from one to four carbon atoms and R$_1$ is a member selected from the group consisting of hydrogen, fluoro and methyl.

3. A chemical compound of the class consisting of a free base and its quaternary salts, the free base having the following structural formula:

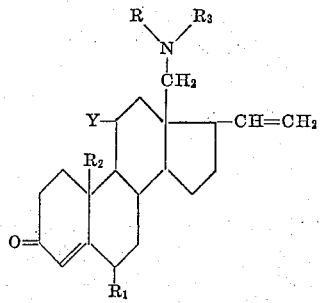

in which Y is a member selected from the group consisting of hydrogen and keto; R and R$_3$ are lower alkyl of from one to four carbon atoms; R$_1$ is a member selected from the group consisting of hydrogen, fluoro and methyl; and R$_2$ is a member selected from the group consisting of hydrogen and methyl.

4. A chemical compound according to claim 3 in which Y is keto and R$_2$ is methyl.

5. A chemical compound having the following structural formula:

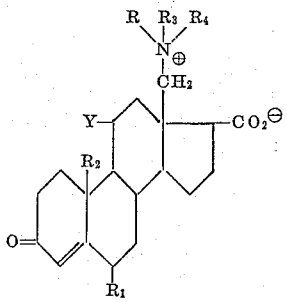

in which Y is a member selected from the group consisting of hydrogen and keto; R, R$_3$ and R$_4$ are lower alkyl of from one to four carbon atoms; R$_1$ is a member selected from the group consisting of hydrogen, fluoro and methyl; and R$_2$ is a member selected from the group consisting of hydrogen and methyl.

6. A chemical compound according to claim 5 in which Y is keto and R$_2$ is methyl.

7. The method of forming 3-keto-$\Delta^4$-conanines having the following formula:

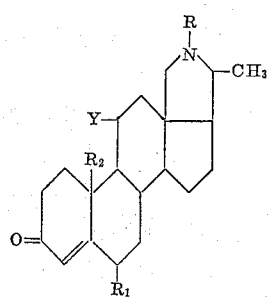

in which Y is a member selected from the group consisting of hydrogen and keto; R is lower alkyl of from one to four carbon atoms; R$_1$ is a member selected from the group consisting of hydrogen, fluoro and methyl; and R$_2$ is a member selected from the group consisting of hydrogen and methyl which comprises irradiating with ultraviolet light in the presence of trifluoroacetic acid a 3-keto-Δ⁴-20-(N-alkyl-N-haloamino)-steroid having the following formula:

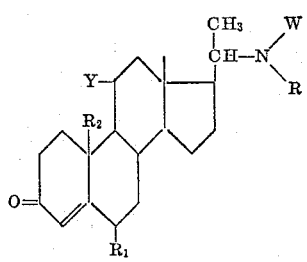

in which W is a halo member selected from the group consisting of chloro and bromo; and Y, R, $R_1$ and $R_2$ are as defined above, to form a 3-keto-Δ⁴-18-halo steroid having the following formula:

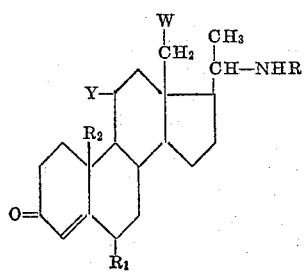

in which Y, W, R, $R_1$ and $R_2$ are as defined above; and treating said 18-halo steroid with alkali.

8. A chemical compound having the following fundamental formula:

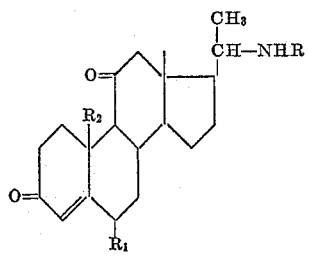

in which R is lower alkyl of from one to four carbon atoms; $R_1$ is a member selected from the group consisting of hydrogen, fluoro and methyl; and $R_2$ is a member selected from the group consisting of hydrogen and methyl.

9. A chemical compound having the following fundamental formula:

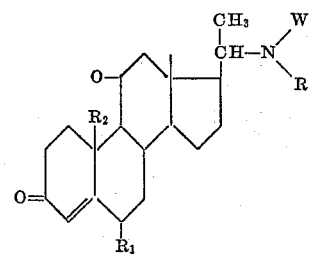

in which W is a halo member selected from the group consisting of chloro and bromo; R is lower alkyl of from one to four carbon atoms; $R_1$ is a member selected from the group consisting of hydrogen, fluoro and methyl; and $R_2$ is a member selected from the group consisting of hydrogen and methyl.

10. A chemical compound having the following fundamental formula:

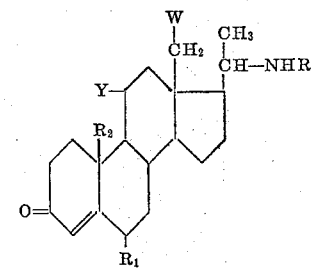

in which Y is a member selected from the group consisting of hydrogen and keto; W is a halo member selected from the group consisting of chloro and bromo; R is lower alkyl of from one to four carbon atoms; $R_1$ is a member selected from the group consisting of hydrogen, fluoro and methyl; and $R_2$ is a member selected from the group consisting of hydrogen and methyl.

11. The method of forming 3-keto-Δ⁴-17,18-steroidal lactones having the following formula:

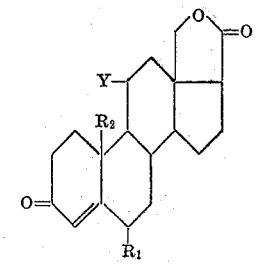

in which Y is a member selected from the group consisting of hydrogen and keto; $R_1$ is a member selected from the group consisting of hydrogen, fluoro and methyl; and $R_2$ is a member selected from the group consisting of hydrogen and methyl, which comprises heating at from about 50–150° C. a betaine of the following formula:

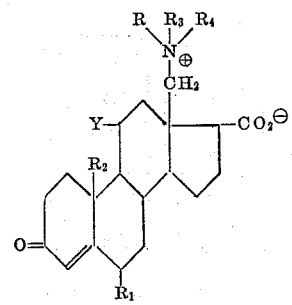

in which Y, $R_1$ and $R_2$ are as defined above, and R, $R_3$ and $R_4$ are lower alkyl of from one to four carbon atoms.

12. A chemical compound having the following structural formula:

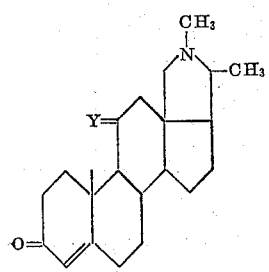

13. A chemical compound having the following structural formula:

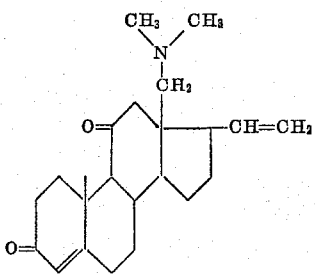

14. A chemical compound having the following structural formula:

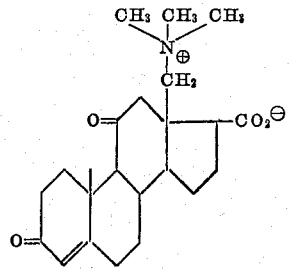

15. 3,11-diketo-20α-methylamino-4-pregnene.
16. 3,11 - diketo - 20α - (N-methyl-N-chloroamino)-4-pregnene.
17. 3,11-diketo-18-chloro-20α-methylamino-4-pregnene.
18. 3-keto-18-hydroxy-19-nor-4-etiocholenic acid, γ-lactone.
19. 3-keto-6β-fluoro-18-hydroxy-4-etiocholenic acid, γ-lactone.

References Cited in the file of this patent
UNITED STATES PATENTS

| | | |
|---|---|---|
| 2,847,425 | Brink et al. | Aug. 12, 1958 |
| 2,913,455 | Pappo | Nov. 17, 1959 |